United States Patent
Hinque (10) Patent No.: US 9,126,462 B2
(45) Date of Patent: *Sep. 8, 2015

(54) COMPACT VALVE SYSTEM FOR SELF-INFLATING TIRE

(71) Applicant: The Goodyear Tire & Rubber Company, Akron, OH (US)

(72) Inventor: Daniel Paul Luc Marie Hinque, Habay-la-Neuve (BE)

(73) Assignee: The Goodyear Tire & Rubber Company, Akron, OH (US)

(*) Notice: Subject to any disclaimer, the term of this patent is extended or adjusted under 35 U.S.C. 154(b) by 342 days.

This patent is subject to a terminal disclaimer.

(21) Appl. No.: 13/826,844

(22) Filed: Mar. 14, 2013

(65) Prior Publication Data

US 2014/0174622 A1    Jun. 26, 2014

Related U.S. Application Data

(60) Provisional application No. 61/745,027, filed on Dec. 21, 2012.

(51) Int. Cl.
   *B60C 23/12* (2006.01)
   *B60C 29/04* (2006.01)

(52) U.S. Cl.
   CPC ................ *B60C 23/12* (2013.01); *B60C 29/04* (2013.01); *Y10T 152/10495* (2015.01)

(58) Field of Classification Search
   CPC ................................ B60C 23/12; B60C 29/04
   USPC .................. 152/419, 423, 424, 425, 426, 429
   See application file for complete search history.

(56) References Cited

U.S. PATENT DOCUMENTS

| | | | | |
|---|---|---|---|---|
| 1,050,886 A | * | 1/1913 | Wetherell | 152/426 |
| 1,250,476 A | | 12/1917 | Hammersmith | |
| 1,413,531 A | | 4/1922 | Harris | |
| 2,634,785 A | * | 4/1953 | Tubbs | 152/427 |
| 3,247,882 A | * | 4/1966 | Pratt | 152/429 |
| 3,304,981 A | * | 2/1967 | Sheppard | 152/426 |
| 4,103,549 A | | 8/1978 | Schmidt | |

(Continued)

FOREIGN PATENT DOCUMENTS

GB    2255850 B    11/1994

OTHER PUBLICATIONS

European Search Report, (Jul. 31, 2014).

*Primary Examiner* — Kip T Kotter
(74) *Attorney, Agent, or Firm* — June E. Rickey (57) ABSTRACT

A self-inflating tire assembly includes an air passageway in the tire that is operable to be sequentially flattened by the tire footprint in a direction opposite to a tire direction of rotation to pump air from an inlet device through the passageway to an outlet device for direction into the tire cavity. A valve device for a tire is also disclosed. The valve device includes an insert mounted in the tire, a valve body mounted within the valve insert; wherein the valve body has a first, second and third chamber, wherein a first and second check valve is positioned in the first and second chamber. A pressure membrane is received within the valve body, and positioned to open and close the third chamber. The pressure membrane is in fluid communication with the tire cavity and the third chamber of the valve body. A spring is received within the third chamber and is positioned to exert force upon the pressure membrane to bias the pressure membrane position relative to the channel in the open position.

18 Claims, 14 Drawing Sheets

(56) References Cited

U.S. PATENT DOCUMENTS

| | | | |
|---|---|---|---|
| 4,601,254 A | 7/1986 | Huang et al. | |
| 5,856,619 A | 1/1999 | Wang | |
| 5,957,151 A * | 9/1999 | Dalcourt et al. | 137/225 |
| 6,525,655 B2 | 2/2003 | Huang | |
| 6,531,960 B1 | 3/2003 | Gladstone et al. | |
| 6,595,046 B2 | 7/2003 | Lemberger et al. | |
| 6,911,903 B2 | 6/2005 | Gladstone et al. | |
| 7,131,632 B2 | 11/2006 | Kish, Jr. | |
| 7,421,889 B2 | 9/2008 | Lin | |
| 7,493,808 B2 | 2/2009 | Milanovich et al. | |
| 7,667,583 B2 | 2/2010 | Petrucelli | |
| 7,764,168 B1 | 7/2010 | Huang | |
| 8,573,270 B2 | 11/2013 | Hinque | |
| 2004/0112495 A1* | 6/2004 | Weise | 152/331.1 |
| 2005/0072349 A1 | 4/2005 | Perlin et al. | |
| 2006/0118224 A1* | 6/2006 | Ellmann | 152/415 |
| 2011/0146868 A1* | 6/2011 | Losey et al. | 152/426 |
| 2013/0048176 A1 | 2/2013 | Hinque | |
| 2013/0048178 A1 | 2/2013 | Hinque | |
| 2014/0000778 A1* | 1/2014 | Gobinath | 152/450 |
| 2014/0020805 A1* | 1/2014 | Gobinath et al. | 152/450 |
| 2014/0174619 A1 | 6/2014 | Hinque | |

* cited by examiner

COMPACT VALVE SYSTEM FOR SELF-INFLATING TIRE

FIELD OF THE INVENTION

The invention relates generally to self-inflating tires and, more specifically, to a pump mechanism for such tires.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependant upon the driver taking remedial action when warned to re-inflate a tire to recommended pressure. It is a desirable, therefore, to incorporate a self-inflating feature within a tire that will self-inflate the tire in order to compensate for any reduction in tire pressure over time without the need for driver intervention.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Passageway" means an integrally formed pathway in the tire or a discrete tube inserted in the tire forming the pump.

"Peristaltic" means operating by means of wave-like contractions that propel contained matter, such as air, along passageways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

Figure 1:
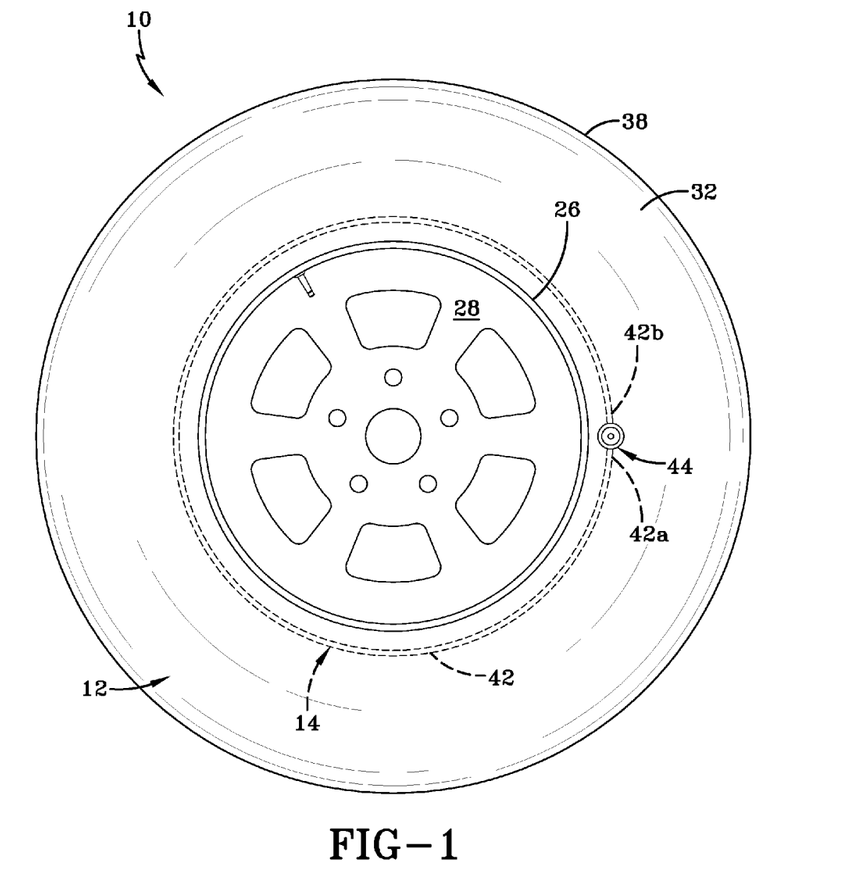
FIG. 1 is an isometric view of tire and rim assembly showing a single peristaltic pump assembly.
Figure 3:
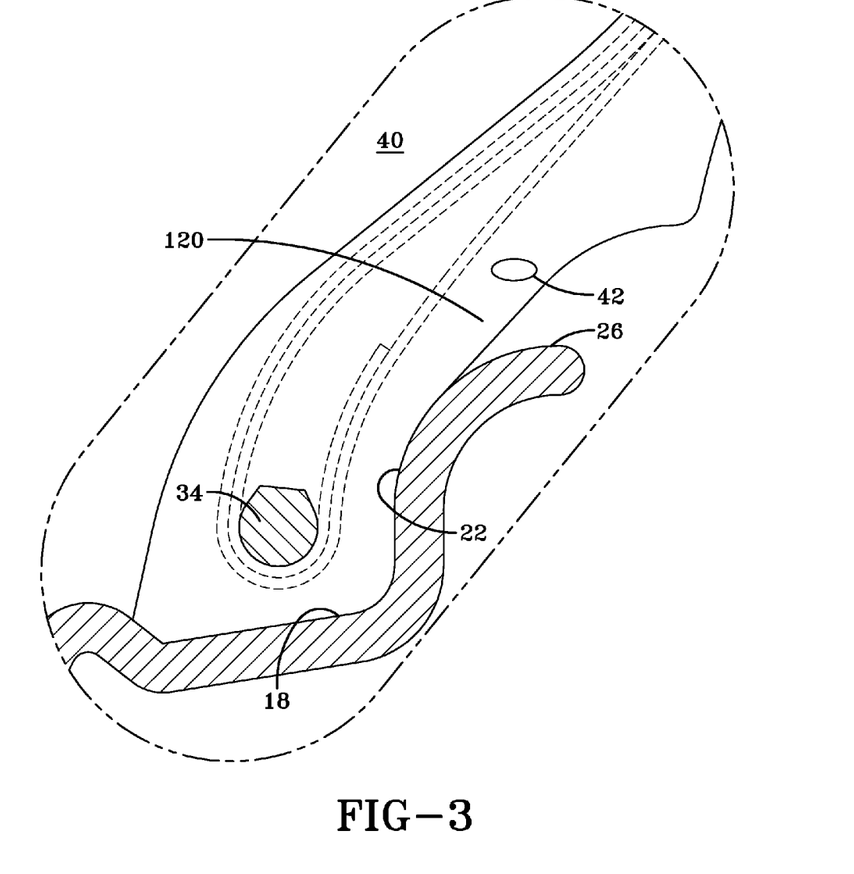
FIG. 3 is an enlarged cross-sectional view of a pump in the bead area of the tire.

Referring to FIGS. 1 and 3, a tire assembly 10 includes a tire 12, a peristaltic pump assembly 14, and a tire rim 16. The tire mounts in a conventional fashion to a pair of rim mounting surfaces 18 located adjacent outer rim flanges 22. The outer rim flange 22 has an outer rim surface 26. An annular rim body 28 joins the rim flanges 22 and supports the tire assembly as shown. The tire is of conventional construction, having a pair of sidewalls 32 extending from opposite bead areas 34 to a crown or tire tread region 38. The tire and rim enclose an interior tire cavity 40.

As shown in FIG. 1 the peristaltic pump assembly 14 includes a pump passageway 42 that is mounted or located in the sidewall area of the tire, preferably near the bead region. The pump passageway 42 may be formed of a discrete tube made of a resilient, flexible material such as plastic, elastomer or rubber compounds, and is capable of withstanding repeated deformation cycles when the tube is deformed into a flattened condition subject to external force and, upon removal of such force, returns to an original condition generally circular in cross-section. The tube is of a diameter sufficient to operatively pass a volume of air sufficient for the purposes described herein and allowing a positioning of the tube in an operable location within the tire assembly as will be described. Preferably, the tube has a circular cross-sectional shape, although other shapes such as elliptical may be utilized.

The pump passageway may also be integrally formed into the sidewall of the tire during vulcanization, eliminating the need for an inserted tube. A pump passageway is preferably formed by building into a selected tire component such as a chafer, a removable strip made of wire or silicone, which is them removed post cure to form a molded in pump air passageway. Hereinafter, the term "passageway" refers either to installed tubes or integrally molded passageway.

Figure 2:
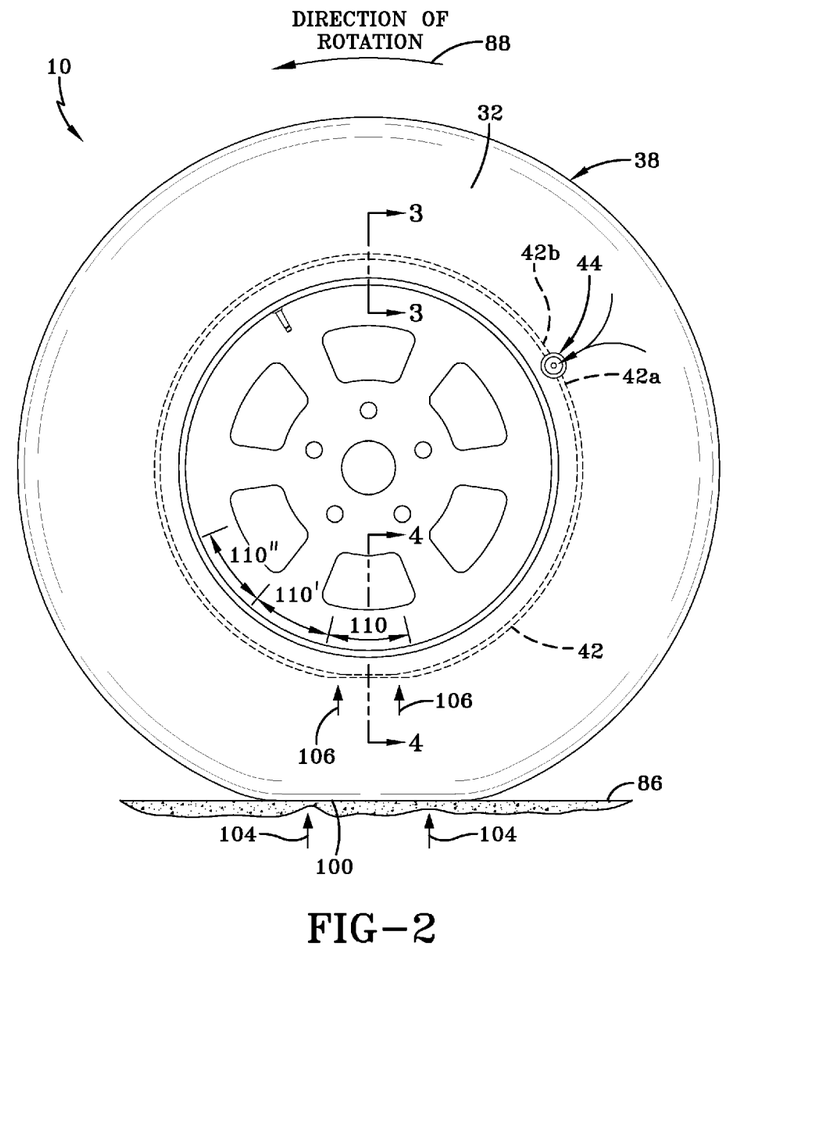
FIG. 2 illustrates a side view of the tire, rim, pump, and valves showing operation of the pump to the tire cavity when the tire rotates.

FIGS. 1 and 2 are illustrations of the pump in the tire, and are not shown in phantom as they should be, in order to facilitate understanding of the system. The location selected for the air passageway within the tire may be within a tire component residing within a high flex region of the tire, sufficient to progressively collapse the peristaltic internal hollow air passageway as the tire rotates under load thereby conveying air along the air passageway from the inlet to the pump outlet.

The pump air passageway 42 has an inlet end 42a and an outlet end 42b joined together by a flow controller 44. As shown, the inlet end 42a and the outlet end 42b are spaced apart approximately 360 degrees forming an annular pump assembly.

Figure 6:
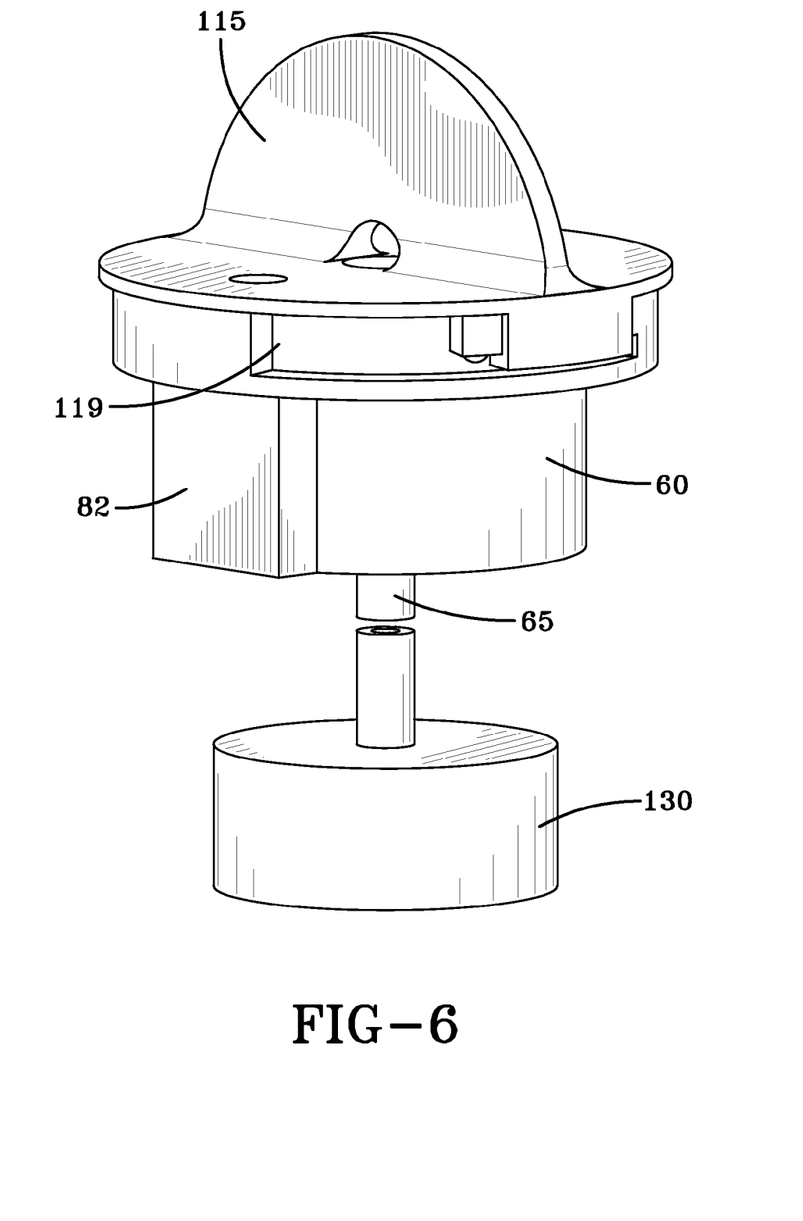
FIG. 6 is a front view of the flow controller and filter assembly.
Figure 7:
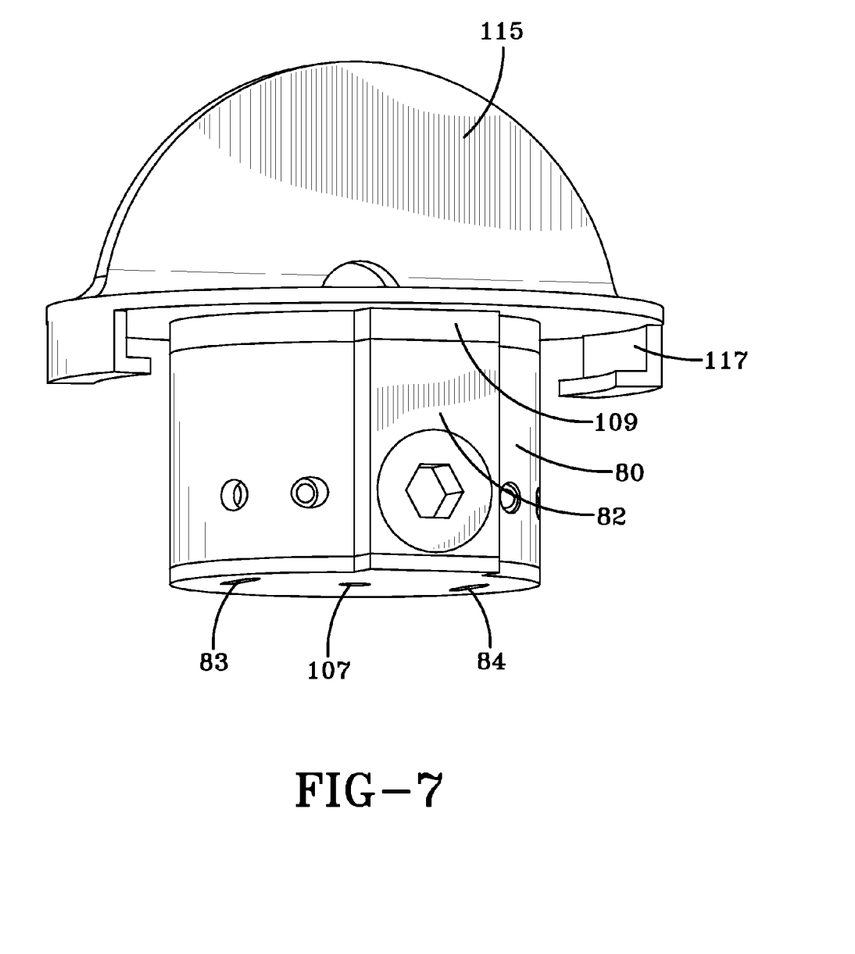
FIG. 7 is a side view of the valve insert.
Figure 8:
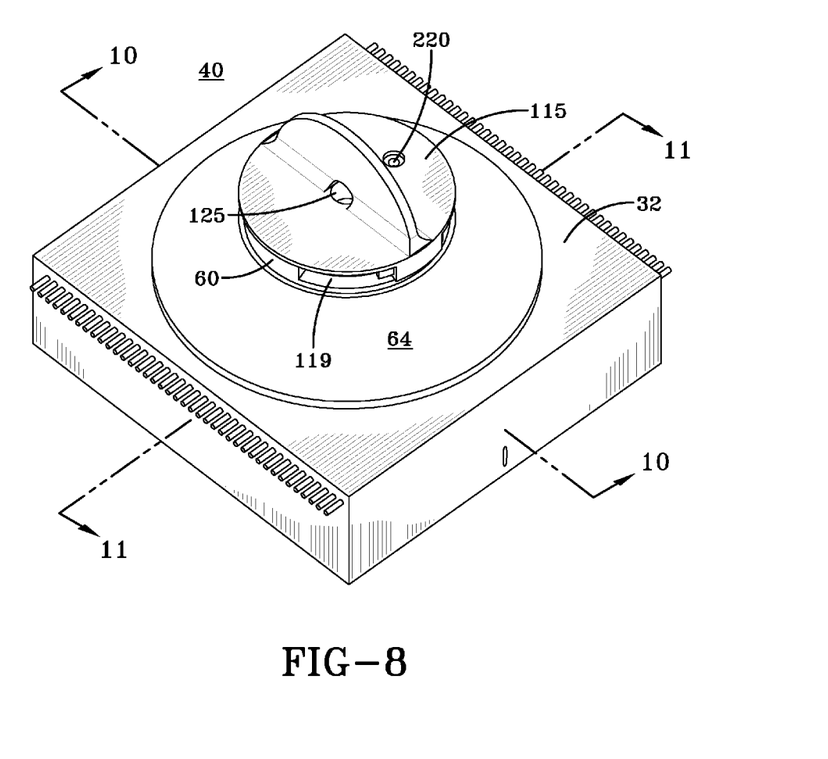
FIG. 8 is a top view of the flow controller valve shown mounted in a partial section of the tire.
Figure 9:
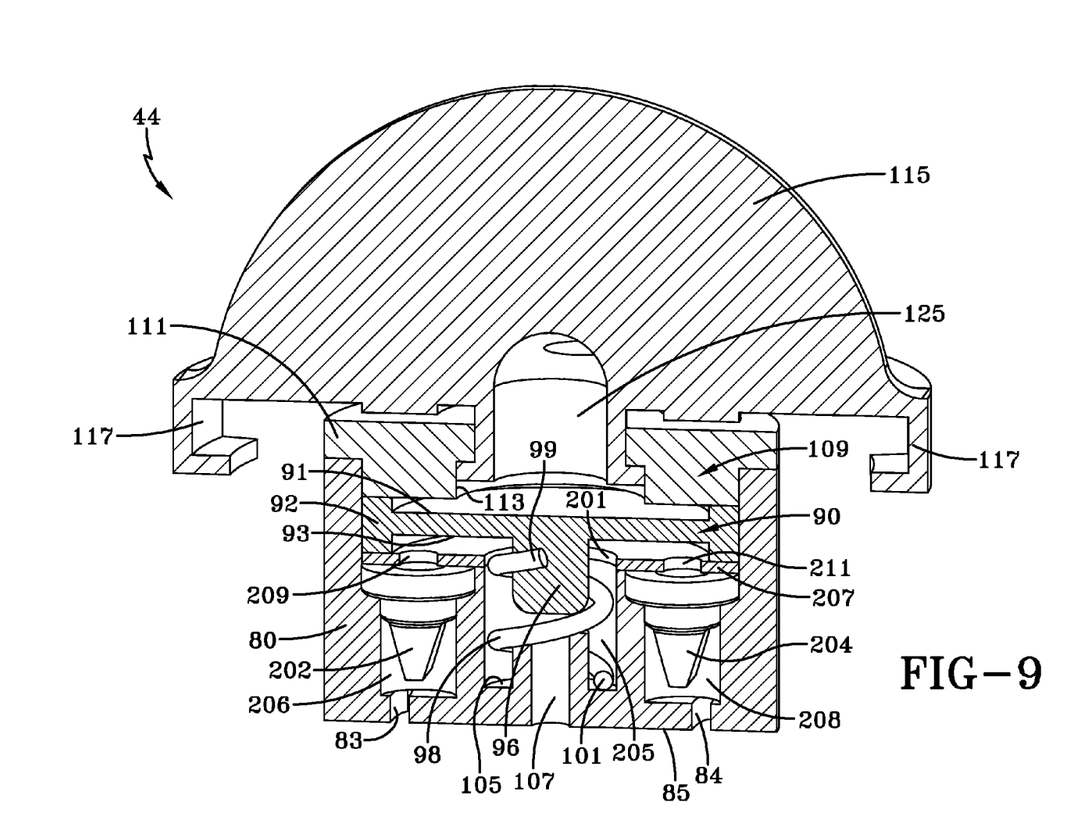
FIG. 9 is a cross-sectional view of the valve insert of FIG. 7.
Figure 10:
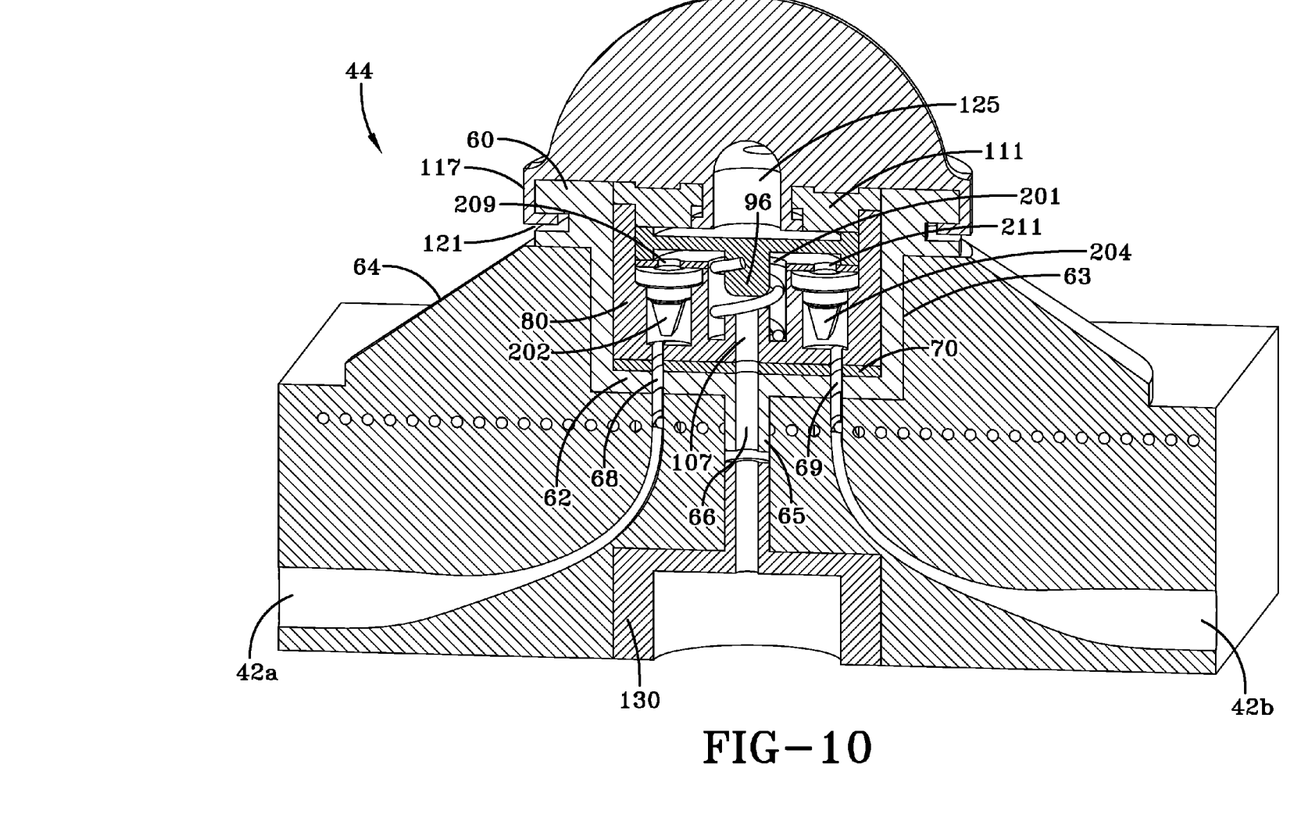
FIG. 10 is a cross-sectional side view of the flow controller valve and filter assembly shown mounted in a tire sidewall.

A first embodiment of a flow controller 44 is shown in FIGS. 5-15. The flow controller device 44 functions to regulate the inlet flow and exit flow of the pump passageway 42. As shown in FIGS. 6 and 10, the flow controller 44 includes an outer insert 60 that is inserted into a receptacle 64 built in the tire.

As shown in FIG. 8, the receptacle 64 is a raised hump formed on the tire inner surface and may optionally include a threaded inner hole, wherein the hump is built into the tire sidewall using a series of concentric layers of material, such as uncured elastomer, green rubber. A one piece molded shape may also be used instead of the concentric layers.

Alternatively, the outer insert 60 may be inserted into the receptacle prior to vulcanization. The outer insert may be made of green rubber, elastomer, nylon, ultra high molecular weight polyethylene. The insert is preferably coated with a suitable adhesive such as resorcinol formaldehyde latex (RFL) or commonly referred to as "dip" known to those skilled in the art. The outer surface of the insert may be roughened and coated with the selected RFL. The outer surface of the insert may further include ridges, flanges, extensions, threads or other mechanical means in addition to the selected RFL to retain the insert into the rubber of the tire sidewall.

As shown in FIG. 10, the outer insert 60 has an interior section formed by an open end facing the tire cavity, a bottom wall 62 opposite the open end and a curved sidewall 63. The bottom wall has a male portion 65 extending from the bottom wall. The male portion has a hole 66 therethough for communicating filtered air to the interior of the valve. The bottom portion also has two opposed holes 68, 69 for alignment and fluid communication with the pump inlet and outlet ends, respectively 42a, 42b. A gasket 70 is positioned on the bottom wall 62 of the insert 60. The gasket is circular and flat, with three holes aligned with the three holes 66, 68, 69 of the insert 60.

The flow controller device further comprises a valve insert 80 as shown in FIGS. 6, 7, 9, and 10. The valve insert is generally cylindrical in shape, with an alignment key 82 projecting from the body. The alignment key is seated in mating engagement with an alignment slot 81 formed in the sidewall 63 of the outer insert 60. They alignment key 82 ensures that holes 83, 84 on the bottom surface 85 of the valve body aligns with holes 68, 69 of the insert. The insert 60 is an optional component that may be eliminated, and the outer surface of the valve body 80 may be threaded for reception into the receptacle 64.

As shown in FIG. 9, a pressure membrane 90 is received within the valve body inner chamber wherein the outer flanged rim 92 of the pressure membrane 90 is seated on a flow control plate 207. The pressure membrane 90 is preferably disk shaped and formed of a flexible material such as, but not limited to, rubber, elastomer, plastic or silicone. On the side of the pressure membrane facing the third chamber, a plug 96 protrudes from the membrane. The plug is positioned to plug a channel 107 protruding from the bottom wall of the chamber and prevent flow from the outside air into the third chamber 205, and hence, airflow into the pump passageway 42.

A spring 98 has a first end 99 wrapped around the plug 96, and a second end 101 wrapped around the channel 107 which extends from the bottom wall 105 of the third chamber. The tire cavity pressure overrides the opposing spring force and biases the pressure membrane into the closed position until the tire cavity pressure falls below a threshold value. The channel 107 extends from the chamber 205 through the bottom surface and in alignment with the hole 66 of male portion 65 of the insert 60 as shown in FIG. 10. Channels 107 and 66 are in fluid communication with a filter assembly 130. The filter assembly 130 may be mounted on the outside portion of the tire, opposite the flow controller. The filter assembly has filter media (not shown) for filtering the outside air and preventing debris and fluid from entering the pump. The filter assembly may be formed of a hard plastic cup shaped device mounted in the tire sidewall precure or postcure, and have an opening in fluid communication with the internal chamber 205 of the valve body.

Figure 11:
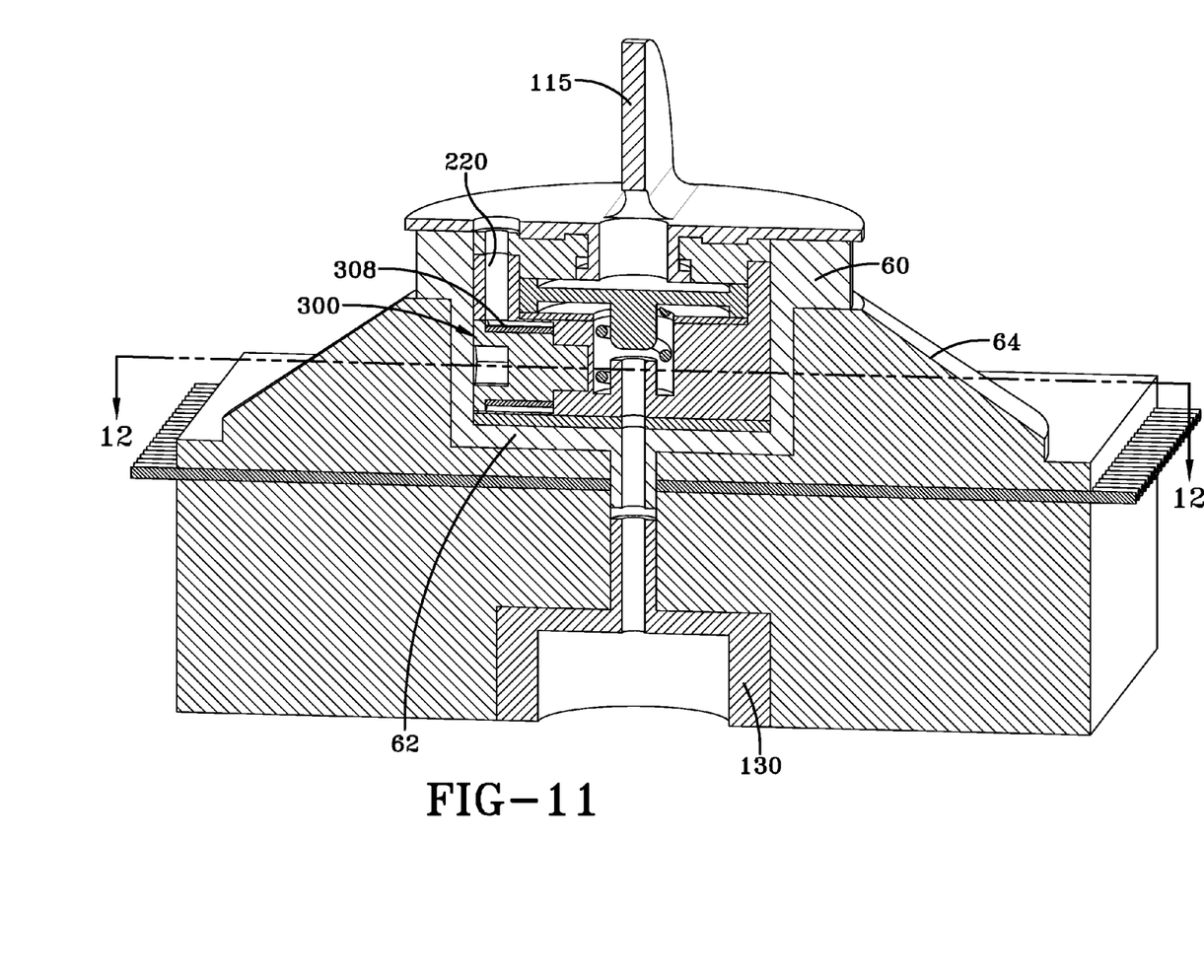
FIG. 11 is a cross-sectional side view of the inlet control valve and filter assembly shown mounted in a tire sidewall in a direction 90 degrees to that of FIG. 10.

As shown in FIGS. 9 through 11, lid 109 is positioned over the pressure membrane 90. The lid has a flanged portion 111 which engages the rim of the pressure membrane. The lid 109 further includes a central hole 113. The lid 109 is secured to the flow controller 44 via a slideable retainer 115. The retainer 115 has opposed U shaped ends 117 which are first aligned into opposed cutout recesses 119, and then rotated into engagement with mating grooves 121 of flanged ends 123 of insert 60. The retainer 115 has a hole 125 aligned with hole 113 of cap to allow fluid communication of the tire cavity with the pressure membrane.

As shown in FIG. 9, the valve body 80 has three interior chambers 205, 206, 208. A first duckbill or check valve 202 is positioned in first chamber 206. A second duckbill or check valve 204 is positioned in second chamber 208. The third chamber 205 has a channel 107 which supplies filtered outside air to the flow controller. The plug of the pressure membrane is positioned in the third channel to close off flow from the channel 107. A spring 98 is housed within third chamber 205, and is positioned to bias the pressure membrane in the open position when the tire cavity pressure falls to Pset level, wherein Pset is the tire pressure value at which the control valve opens and allows air into the pump to initiate pumping action.

The third chamber has an open hole 201 (opposite channel 107) through a flow control plate 207. The flow control plate 207 has aligned holes 209, 211 to direct the flow into the duckbill valves 202, 204 from the third chamber 205. The duckbill valves 202/204 prevent backflow from the pump passageway into the chamber 205.

Figure 12:
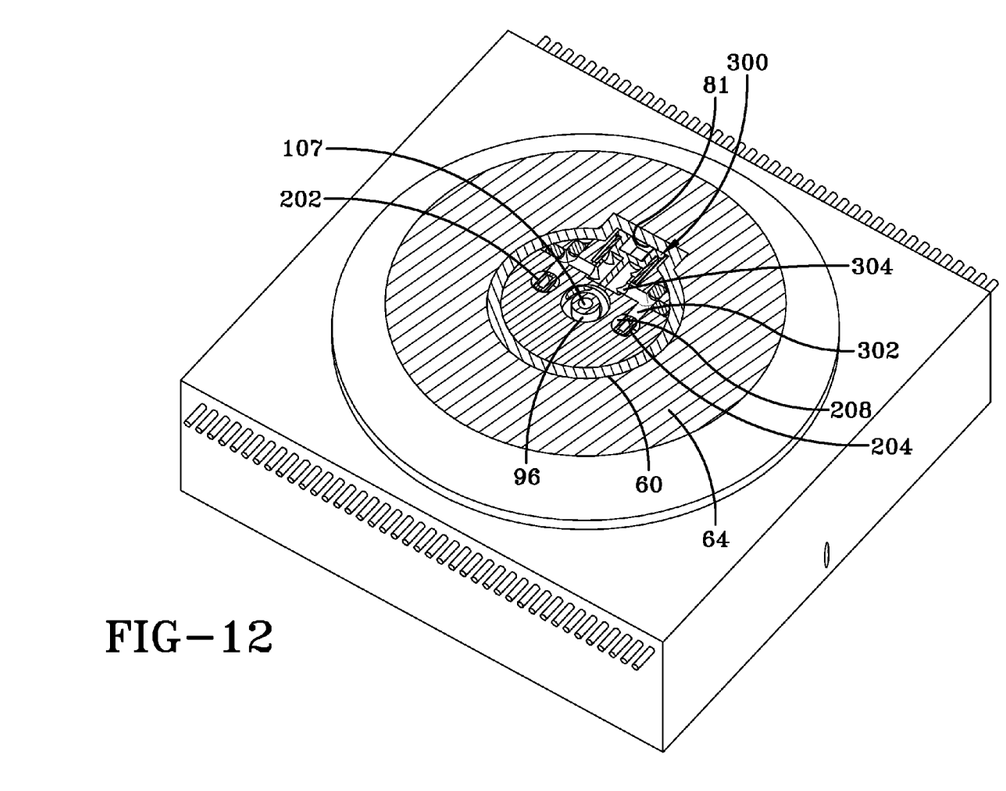
FIG. 12 is a cross-sectional view of the control valve body in the direction 12-12 of FIG. 11.
Figure 13:
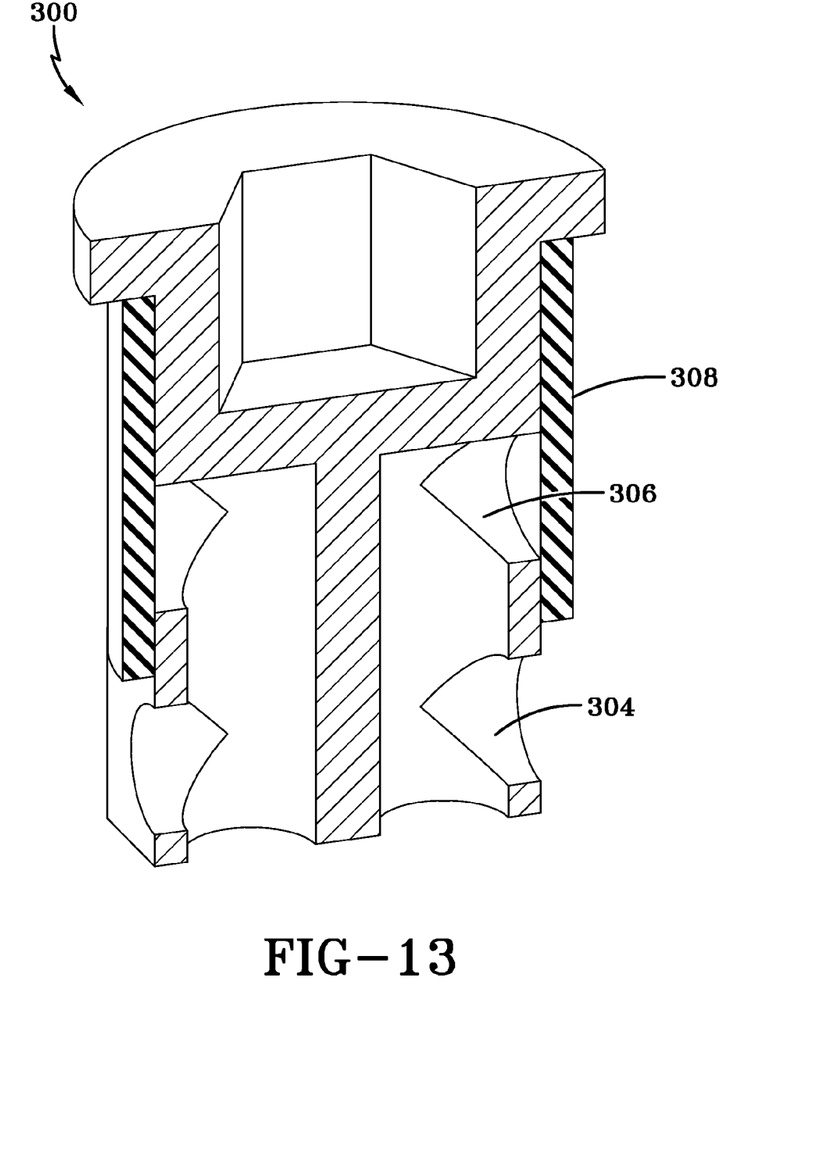
FIG. 13 is a cross-sectional view of a sleeve valve.
Figure 14:
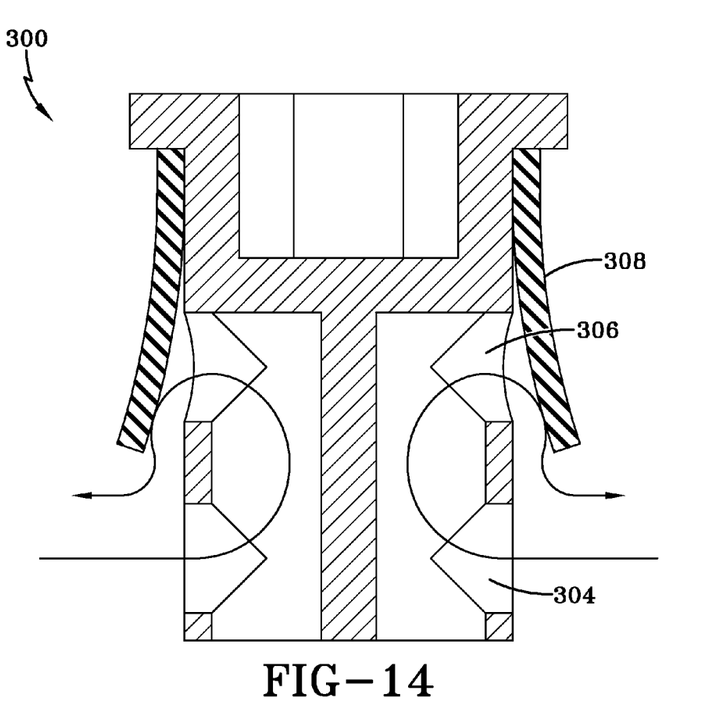
FIG. 14 is an illustration showing operation of the sleeve valve.
Figure 15:
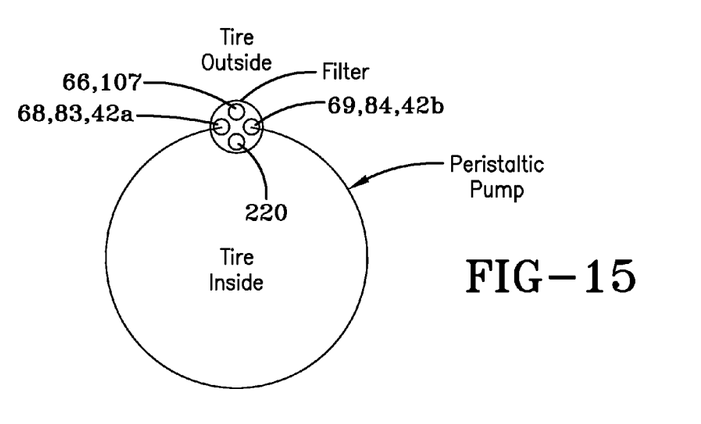
FIG. 15 is a schematic of the pump connection.

The pressure membrane 90 is responsive to the pressure in the interior of the tire cavity 40 on the cavity side 91 of the membrane, and is responsive to the pressure in the inlet chamber on the valve side 93 of the membrane. If the tire pressure is sufficiently high, the tire pressure pushes the plug of the membrane into sealing engagement with the channel 107, overcoming the spring force, wherein the pressure membrane seals off flow from the channel 107 so that no airflow may enter the pump inlet end 42a. As the tire loses air pressure it will reach a set trigger pressure Pset. When the tire pressure is at or below the trigger pressure Pset, the spring force is sufficient to unseat the pressure membrane plug from the channel, opening up the channel 107. Filtered, outside air may then enter the flow controller through the channel 107 of the valve body, then through the third or central chamber 205, into the first chamber 206 through hole 209 and out hole 83 into pump inlet 42a. As the tire rotates, the air is pumped from the inlet to the pump outlet 42b. As shown in FIGS. 11 and 12, as the flow enters chamber 208, the fluid exits though a channel 302 and then enters the one way sleeve valve 300 through inlet port 304. The fluid travels up the sleeve valve and exits through outlet port 306 as shown in FIG. 14. The sleeve valve 300 has a one way resilient flap 308 which allows the fluid to exit into outlet channel 220. Outlet channel 220 is in fluid communication with the pump cavity. Thus as the tire rotates air is pumped into the tire cavity.

As will be appreciated from FIG. 2, air maintenance pump passageway 42 is a bi-directional, 360 degree pump, with the inlet and outlet co-located. If the tire cavity pressure is below the trigger pressure, membrane plug opens the channel 107 allowing filtered outside air to enter the valve body chamber 205 and into the pump tube inlet 42a. As the tire rotates in a direction of rotation 88, a footprint 100 is formed against the ground surface 86. A compressive force 104 is directed into the tire from the footprint 100 and acts to flatten a segment 110 of the pump passageway 42 a as shown at numeral 106. Flattening of the segment 110 of the pump passageway 42 forces a portion of air located between the flattened segment 110 and the flow controller 44, in the direction towards the flow controller 44. As the tire continues to rotate in direction 88 along the ground surface 86, the pump passageway 42 will be sequentially flattened or squeezed segment by segment 110, 110', 110" in a direction opposite to the direction of tire rotation 88. The sequential flattening of the pump passageway 42 segment by segment causes the column of air located between the flattened segments to be pumped within pump passageway 42 to the pump outlet 42b. Flow enters the flow controller chamber 208 and then into channel 302. The flow then enters inlet port 304 of sleeve valve 300 and then exits outlet port 306 of sleeve valve into outlet channel 220 and into the tire cavity. With the tire rotating in direction 88, flattened tube segments are sequentially refilled by air 92 flowing into the flow controller 44 along the pump passageway 42 as shown by FIG. 2. This cycle continues until the tire cavity pressure is sufficient to overcome the spring force 98 and plug the channel, no longer allowing air flow to enter the pump.

Figure 4:
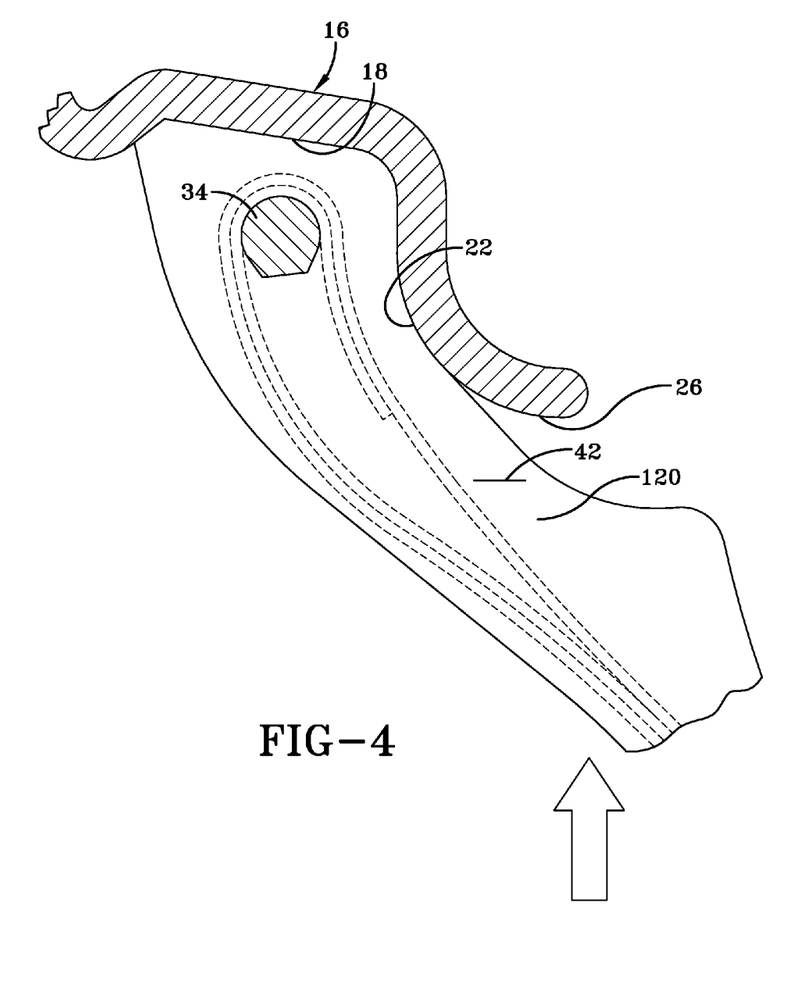
FIG. 4 is an enlarged cross-sectional view illustrating the pump being compressed in the tire bead area.
Figure 5:
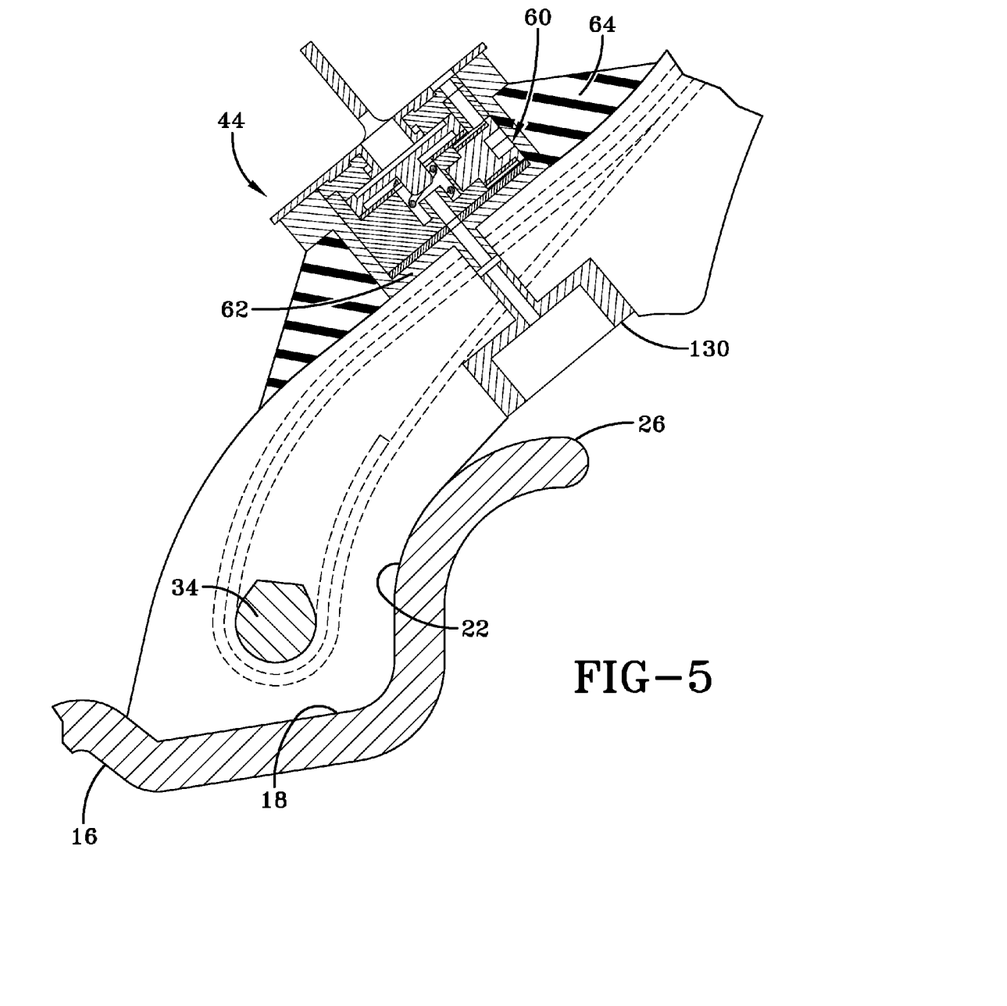
FIG. 5 is an enlarged cross sectional view of the bead area with the flow controller and filter assembly shown mounted in the tire.

The location of the peristaltic pump assembly will be understood from FIGS. 3-4. In one embodiment, the peristaltic pump assembly 14 is positioned in the tire sidewall, radially outward of the rim flange surface 26 in the chafer 120. So positioned, the pump passageway 42 is radially inward from the tire footprint 100 and is thus positioned to be flattened by forces directed from the tire footprint as described above. The segment that is opposite the footprint 100 will flatten from the compressive force 104 from the footprint 100 pressing the tube segment against the rim flange surface 26. Although the positioning of the pump passageway 42 is specifically shown as between a chafer 120 of the tire at the bead region 34 and the rim surface 26, it is not limited to same, and may be located at any region of the tire such as anywhere in the sidewall or tread.

From the forgoing, it will be appreciated that the subject invention may be used with a secondary tire pressure monitoring system (TPMS) (not shown) of conventional configuration that serves as a system fault detector. The TPMS may be used to detect any fault in the self-inflation system of the tire assembly and alert the user of such a condition.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A self-inflating tire assembly comprising:
    a. a tire having a tire cavity, a first and second sidewall extending respectively from first and second tire bead regions to a tire tread region;
    b. said tire having a passageway, said passageway having an inlet end and an outlet end,
    c. a valve device connected to the inlet end and outlet end of the passageway, wherein the valve device has a valve body having a first, second and third chamber, said first chamber having a first hole in fluid communication with the inlet end of the passageway, said second chamber having a second hole in fluid communication with the outlet end of the passageway, and a third chamber having a channel in fluid communication with the ambient air;
    d. wherein a first and second one way valve is positioned in the first and second chamber, respectively; wherein a pressure membrane is received within the valve body, and positioned to open and close the channel;
    e. wherein the second chamber is in fluid communication with the tire cavity.

2. The self-inflating tire assembly of claim 1 wherein the second chamber is in fluid communication with an outlet channel, wherein the outlet channel has an outlet to the tire cavity.

3. The self-inflating tire assembly of claim 2 wherein a one way flow valve is positioned in the outlet channel.

4. The self-inflating tire assembly of claim 3 wherein the one way flow valve is a sleeve valve.

5. The self-inflating tire assembly of claim 3 wherein the one way flow valve is a duckbill valve.

6. The self-inflating tire assembly of claim 3 wherein the one way flow valve is a check valve.

7. The self-inflating tire assembly of claim 2 wherein the valve body is mounted within a valve insert.

8. The self-inflating tire assembly of claim 1 wherein the first chamber is in fluid communication with an outlet channel, wherein the outlet channel has an outlet to the tire cavity.

9. The self-inflating tire assembly of claim 1 wherein the valve device including an insert molded in the tire.

10. The self-inflating tire assembly of claim 1 wherein the pressure membrane is in fluid communication with the tire cavity and the third chamber of the valve body.

11. The self-inflating tire assembly of claim 1 wherein a spring is received within the third chamber and is positioned to exert force upon the pressure membrane to bias the pressure membrane position relative to the channel in the open position.

12. The self-inflating tire assembly of claim 11 wherein the pressure membrane has a plug and the spring has a first end mounted about the plug, wherein the plug is positioned to close an end of the channel.

13. The self-inflating tire assembly of claim 1 wherein a control plate is positioned between the pressure membrane and the first and second one way valve, wherein the control plate has a hole aligned for communicating flow from the third chamber into one of the first and second chamber.

14. A valve device for a tire having a tire cavity, the valve device comprising:

a. an insert mounted in the tire, a valve body mounted within the insert; wherein the valve body has a first, second and third chamber, wherein a first and second one way valve is positioned in the first and second chamber, respectively;

b. wherein a pressure membrane is received within the valve body, and positioned to open and close the third chamber;

c. said pressure membrane is in fluid communication with the tire cavity and the third chamber of the valve body;

d. wherein a spring is received within the third chamber and is positioned to exert force upon the pressure membrane to bias the pressure membrane position relative to the third chamber in an open position.

15. The valve device of claim 14 wherein the pressure membrane has a plug and the spring has a first end mounted about the plug.

16. The valve device of claim 14 wherein a control plate is positioned between the pressure membrane and the first and second one way valve, wherein the control plate has a hole aligned for communicating flow from the third chamber into the first chamber.

17. The valve device of claim 16 wherein the control plate has a hole aligned for communicating flow from the third chamber into the second chamber.

18. The valve device of claim 14 wherein the first one way valve is a duck bill type.

\* \* \* \* \*